United States Patent

[11] 3,619,368

| [72] | Inventor | Jan W. Woldendorp<br>Munstergeleen, Netherlands |
|---|---|---|
| [21] | Appl. No. | 873,061 |
| [22] | Filed | Oct. 31, 1969 |
| [45] | Patented | Nov. 9, 1971 |
| [73] | Assignee | Stamicarbon N.V.<br>Heerlen, Netherlands |
| [32] | Priority | Oct. 31, 1968 |
| [33] | | Netherlands |
| [31] | | 6815503 |

[54] PREPARATION OF A CELLULAR MATERIAL RICH IN PROTEIN
7 Claims, No Drawings

[52] U.S. Cl. .................................................... 195/30, 195/82

[51] Int. Cl. ................................................ C12d 13/00

[50] Field of Search............................................ 195/3 H, 28, 30, 82

[56] References Cited
OTHER REFERENCES

Vernerova et al. " Food Protein from Yeasts," Chem. Abs. Vol. 58, #14623B, 1963.

*Primary Examiner*—A. Louis Monacell
*Assistant Examiner*—Gary M. Nath
*Attorney*—Cushman, Darby & Cushman

ABSTRACT: A process of preparing protein by cultivating protein-rich Eumycetes, wherein a mixture of aliphatic mono- and dicarboxylic acids with fewer than 8 carbon atoms is used as a carbon source in a culture medium with a pH between 5.5 and 8.

PREPARATION OF A CELLULAR MATERIAL RICH IN PROTEIN

The present invention relates to a process of preparing protein by cultivating protein-rich Eumycetes under aerobic conditions, in a suitable liquid culture medium.

Various substances have been proposed as carbon sources in protein syntheses of this kind. In the case of the carbohydrate-containing materials long used for the purposer—e.g. molasses—, it was proposed more recently to sue hydrocarbons as a carbon source.

It has now been found that a technically attractive production of protein-rich cellular material in high yields is possible by the use of a culture medium which contains a carbon source consisting of a mixture of aliphatic mono- and diacarboxylic acids with fewer than eight carbon atoms. In practice, a carbon source like this becomes available in fairly large quantities and very cheaply in the wash water obtained when, in the preparation of cyclohexanone from cyclohexane or cyclohexanol, the crude final product is washed with water and/or a dilute sodium hydroxide solution.

With the use of a culture medium containing a carbon source in the form of aliphatic mono- and dicarboxylic acids excellent results prove to be obtainable if during the cultivation of protein-rich Eumycetes the pH of the liquid culture medium is maintained at a value lying between 5.5 and 8. Since the acid concentration in the culture medium decreases during the growth of the micro-organism, it is necessary, in order to maintain the pH at the desired value, to add a pH reducer during this growth, e.g. sulfuric acid or a similar acid, or to use a buffered culture medium.

Consequently, the invention provides a process of preparing protein by cultivating protein-rich Eumycetes under aerobic conditions in a suitable liquid culture medium, and is characterized in that in the culture medium a mixture of aliphatic mono- and dicarboxylic acids with fewer than eight carbon atoms is used as a carbon source, and in that during the cultivation of the micro-organism the pH of the culture medium is maintained at a value lying between 5.5 and 8.

In connection with the ever-growing production of cyclohexane, the process according to the invention is of great practical importance for the processing of the wash water obtained in this production. In practice, this wash water may in most cases be drained only after a costly purification, e.g. by biological breakdown of the organic acids contained in it. The process according to the invention not only purifies the wash water, but also yields a valuable product without any previous purification being required.

To carry out the invention, various genera of Eumycetes can be used, e.g. the genera Candida, Trichosporon, Oospora, Hansenula, Pullularia, Aspergillus, Penicillium, Venturia and Botrytis. Very good results can be obtained by the use of yeast strains belonging to the genus Candida. For instance strains of Candida lipolytica, Candida brumptii, Candida tropicalis and Candida utilis. Also strains of, e.g., Trichosporon cutaneum and Oospora lactis can be used successfully.

In addition to a carbon source, the culture medium should, of course, contain other nutrients, e.g. a nitrogen source, a phosphate source, a magnesium source and, in certain cases, a source of vitamins. Suitable nitrogen sources are, e.g. ammonium nitrate, ammonium sulphate, ammonium acetate, urea, and amino acids. The phosphate source may consist, e.g., of the primary and secondary phosphates of sodium, potassium and ammonium, The magnesium source may be, e.g., magnesium sulfate or magnesium chloride. Also growth-promoting substances, for example those present in yeast extract or cornsteep liquor, may be added.

The process according to the invention can be carried out, both continuously and discontinuously, at temperatures which are in general suited for cultivating micro-organisms, e.g. temperatures of 25°–37° C.

When the process according to the invention was carried out as a continuous process, it was furthermore found that with addition to the culture medium of a small amount of carbon source easily attacked by the micro-organism concerned, for instance glucose, if the micro-organism is a Candida strain or acetic acid in the case of a Trichosporon strain; a much higher concentration of mono- and discarboxylic acids can be used than in the case of a discontinuous realization. In a continuous process, excellent results can be obtained if per gram of carbon contained in the mono- and dicarboxylic carbon source an amount of 1 to 10 milligrams of carbon in the form of an easily accessible carbon source is added to the culture medium. The mono- and dicarboxylic carbon source can then be continuously supplied to the culture medium in a concentration of 25–30 g. per liter calculated as carbon.

The process according to the invention, which can be carried out with the use of methods in the field of biological protein synthesis that are known in themselves, will be elucidated in the following examples, with the invention being restricted thereto.

EXAMPLE I

Various suitable micro-organisms were selected as follows: 1 gram of goat-cheese rind was mixed with 100 milliliters of an aqueous cooking salt solution (concentration 0.8 percent, by weight), and homogenized. Diluted portions of the resulting suspension were smeared onto an agar medium having a pH value of 6.5, of the following composition:

| | |
|---|---|
| adipic acid | 1 g. per litre |
| butyric acid | 0.5 g. per litre |
| valeric acid | 0.7 g. per litre |
| hydroxycaproic acid | 0.7 g. per litre |
| acetic acid | 0.05 g. per litre |
| ammonium sulfate | 3 g. per litre |
| primary potassium phosphate | 7 g. per litre |
| magnesium sulfate 7H$_2$O | 0.4 g. per litre |
| yeast extract | 0.1 gram per litre |
| agar | 15 gram per litre |

After 5 days' incubation at 30° C. various pure cultures were isolated from the agar plates, mainly cultures belonging to the genus Candida.

EXAMPLE II

A strain of Candida brumptii isolated as described in example I was seeded in malt extract and then incubated for 18 hours at 30° C. in a shaking incubator.

Of the active culture obtained in this way, 0.2 milliliter was seeded in a 300 ml. flask into which 50 ml. of a liquid culture medium had previously been introduced, which medium had a pH of 6.5 and possessed the following composition:

| | |
|---|---|
| adipic acid | 1.00 g. per litre |
| butyric acid | 0.50 g. per litre |
| valeric acid | 0.74 g. per litre |
| hydroxycaproic acid | 0.76 g. per litre |
| acetic acid | 0.10 g. per litre |
| ammonium sulfate | 3.00 g. per litre |
| primary potassium sulfate | 7.00 g. per litre |
| magnesium sulfate 7H$_4$O | 0.40 g. per litre |
| yeast extract | 0.10 g. per litre |

Thereafter, incubation at 30° C. was applied for 24 hours, and next the resulting cellular material was isolated by centrifugation washed and dried.

The yield was 1.5 grams of yeast cells per litre of culture medium.

The crude protein content of the yeast was 54 percent by weight.

EXAMPLE III

A strain of Candida lipolytica isolated as described in example I was precultivated in malt extract in the same way as described in example II.

Ten milliliters of the resulting active culture was seeded in a 1.5 litre fermentation vessel containing 1 litre of a liquid culture medium obtained by adding 3 grams of ammonium sulfate, 1 g. of monopotassium phosphate, 0.4 g. of magnesium sulfate 7 $H_2O$ and 1 ml. of cornsteep liquor to 50 ml. of washing water obtained in the preparation of cyclohexanone, and making up with water to 1 liter.

The washing water contained 1.44 g.eq. of acid per liter, composed as follows:

0.114 g.eq. of formic acid
0.054 g.eq. of acetic acid
0.028 g.eq. of propionic acid
0.088 g.eq. of butyric acid
0.308 g.eq. valeric acid
0.068 g.eq. of γ-valerolactone
0.076 g.eq. of caproic acid
0.158 g.eq. of ε-hydroxycaproic acid
0.028 g.eq. of succinic acid
0.010 g.eq. of oxalic acid
0.080 g.eq. of glutaric acid
0.262 g.eq. of adipic acid.

After seeding, the liquid was stirred in the fermentation vessel for 24 hours at 28° C. by means of a turbine stirrer (1200 r.p.m.) and aerated with 60 liters of air per hour, the pH being meanwhile kept at 6.5 by continuous addition of sulfuric acid. The resulting cellular material was then isolated by centrifuging, washed and dried.

The yield was 2.4 g. of dried cellular material having a crude protein content of 54 percent by weight. Of the original amount of carbon present in the organic acids, 84 percent proved to have been converted.

EXAMPLE IV

A strain of *Candida tropicalis* obtained in the way described in example I was precultivated in malt extract.

0.2 milliliter of the resulting active culture was seeded in a 300-ml. flask containing 50 ml. of a liquid culture medium of pH 5.5, having the following composition:

| | |
|---|---|
| acetic acid | 0.27 g. per litre |
| propionic acid | 0.11 g. per litre |
| butyric acid | 0.18 g. per litre |
| valeric acid | 0.05 g. per litre |
| oxalic acid | 0.74 g. per litre |
| succinic acid | 0.15 g. per litre |
| glutaric acid | 0.40 g. per litre |
| adipic acid | 1.42 g. per litre |
| ε-hydroxycaproic acid | 0.56 g. per litre |
| ammonium sulfate | 3.00 g. per litre |
| mono-potassium sulfate | 1.00 g. per litre |
| magnesium sulfate | 0.20 g. per litre |
| yeast extract | 0.50 g. per litre |

After 48 hours' cultivation in a shaking incubator at 30° C., an amount of 5 ml. of the resulting culture medium was seeded in 50 ml. of culture medium of the same original composition as given above. After 36 hours' cultivation at 30° C. this gave 1.2 g. of dry yeast per liter of culture medium.

EXAMPLE V

The strain *Candida utilis* variety *major*, major, was precultivated in malt extract and next cultivated for 24 hours at 32° C. in the same way and in the same culture medium as described in example III.

Thereafter, cultivation was carried on in a continuous process, a liquid culture medium obtained by adding 7.5 g. of ammonium sulfate, 5 g. of mono-potassium sulfate, 2 g. of magnesium phosphate $7H_2O$, 2 g. of yeast extract and 2 g. of glucose to 250 ml. of the washing water referred to in example III, and making up with water to 1 liter being added at the rate of 60 ml. per hour.

Culture medium was continuously drained from the fermentation vessel at the rate of 60 ml. per hour. By adding sulfuric acid, the pH of the fermentation vessel contents was kept at 6.5. The yield was 13.5 g. of dry yeast, with a crude protein content of 55 percent by weight, per liter of culture medium withdrawn.

When this continuous-process experiment was repeated, this time without glucose being added, the concentration of the yeast cells in the fermentation flask decreased slowly, and the yield of dry yeast decreased in 72 hours to less than 1 g. per liter of culture medium.

EXAMPLE VI

A strain of *Oospora lactis*, obtained in the way described in example I, was cultivated in the same way as described in example V. However, this time fresh liquid culture medium was supplied at the rate of 80 ml. per hour, and the yeast-containing medium was withdrawn at the same rate. The culture medium withdrawn contained 13.5 g. of dry cellular material per liter, and the crude protein content of this material was 39 percent by weight.

EXAMPLE VII

After having been precultivated in malt extract, a strain of *Candida lipolytic*, isolated in the way described in example I, was cultivated for 24 hours in the same way and in the same culture medium as described in example III.

Thereafter, cultivation was carried on in a continuous process, fresh culture medium being supplied to the fermentation vessel at the rate of 100 ml. per hour, and yeast-containing culture medium being withdrawn from the flask likewise at the rate of 100 ml. per hour. The fresh culture medium had been obtained by adding 7.5 g. of ammonium sulfate, 5 g. of mono-potassium phosphate, 2 g. of magnesium sulfate $7H_2O$, 0.05 g. of yeast extract, and 1 g. of glucose to 250 ml. of the washing water referred to in example III, and making up with water to 1 liter.

Addition of sulfuric acid was applied to keep the pH of the fermentation vessel contents at 6.5.

The yeast-containing culture medium continuously discharged from the fermentation vessel was continuously fed into a second fermentation vessel having an effective volume of 1 liter, to which at the same time 200 ml. of the above-mentioned fresh culture medium was supplied per hour, and in which the pH was likewise maintained at 6.5 by addition of sulfuric acid. The liquid in the second fermentation vessel was stirred by means of a turbine stirrer and aerated with 70 liters of air per hour. Yeast-containing culture medium having a dry yeast content of 8.7 g. per liter was continuously withdrawn from the second fermentation vessel at the rate of 300 ml. per hour. The crude protein content of the dry yeast was 66.5 percent by weight.

What is claimed is:

1. Process of preparing protein by cultivating protein-rich *Eumycetes* under aerobic conditions, in a suitable liquid culture medium, this process being characterized in that in the culture medium a mixture of aliphatic mono- and dicarboxylic acids with fewer than 8 carbon atoms is used as a carbon source, and in that during the cultivation of the micro-organism the pH of the culture medium is maintained at a value lying between 5.5 and 8.

2. Process according to claim 1, characterized in that the carbon source used is the mixture of mono- and dicarboxylic acids that is obtained in the wash water becoming available in the washing of the crude final product of the preparation of cyclohexanone.

3. Process according to claim 1, characterized in that the micro-organism used is a strain of the genus *Candida*.

4. Process according to claim 3, characterized in that use is made of a strain belonging to one of the species *Candida lipolytica*, *Candida brumptii*, *Candida tropicalis* and *Candida utilis*.

5. Process according to claim 1, characterized in that the micro-organism used is a strain belonging to one of the species *Trichosporon cutaneum* and *Oospora lactis*.

6. Process according to claim 1, characterized in that the process is carried out as a continuous process and in that per gram of carbon contained in the mono- and dicarboxylic carbon source 1 to 10 milligrams of carbon in the form of an available carbon source is added to the culture medium.

7. Process according to claim 1, characterized in that during the cultivation of the micro-organism the temperature is maintained between 25 and 37° C.

* * * * *